US010604266B2

(12) United States Patent
Roever et al.

(10) Patent No.: US 10,604,266 B2
(45) Date of Patent: Mar. 31, 2020

(54) ELECTRICAL ASSIST FOR AIRCRAFT

(71) Applicants: Rolls-Royce Corporation, Indianapolis, IN (US); Rolls-Royce North American Technologies Inc., Indianapolis, IN (US)

(72) Inventors: Douglas M. Roever, Indianapolis, IN (US); Robert Zeller, Noblesville, IN (US)

(73) Assignees: ROLLS-ROYCE CORPORATION, Indianapolis, IN (US); ROLLS-ROYCE NORTH AMERICAN TECHNOLOGIES, INC., Indianapolis, IN (US)

( * ) Notice: Subject to any disclaimer, the term of this patent is extended or adjusted under 35 U.S.C. 154(b) by 423 days.

(21) Appl. No.: 15/432,230

(22) Filed: Feb. 14, 2017

(65) Prior Publication Data

US 2017/0327238 A1    Nov. 16, 2017

Related U.S. Application Data

(60) Provisional application No. 62/337,013, filed on May 16, 2016.

(51) Int. Cl.
| | |
|---|---|
| B64D 27/02 | (2006.01) |
| B64D 27/24 | (2006.01) |
| B64D 35/08 | (2006.01) |
| B64D 31/10 | (2006.01) |
| B64C 27/08 | (2006.01) |
| B64D 27/16 | (2006.01) |
| B64D 29/00 | (2006.01) |

(52) U.S. Cl.
CPC ............. B64D 27/24 (2013.01); B64C 27/08 (2013.01); B64D 27/16 (2013.01); B64D 29/00 (2013.01);
(Continued)

(58) Field of Classification Search
CPC ........ B64C 27/08; B64D 31/10; B64D 35/08; B64D 2027/026; B64D 2221/00
See application file for complete search history.

(56) References Cited

U.S. PATENT DOCUMENTS

2009/0224096 A1 *   9/2009   Waide ................. B64C 29/0033
                                                              244/60
2011/0154805 A1    6/2011   Heathco et al.
(Continued)

FOREIGN PATENT DOCUMENTS

EP        2 962 885 A1    1/2016

OTHER PUBLICATIONS

"Electric aircraft," Mar. 27, 2016, pp. 1-19, Wikipedia, available at en.wikipedia.org.
(Continued)

*Primary Examiner* — Philip J Bonzell
*Assistant Examiner* — Tye William Abell
(74) *Attorney, Agent, or Firm* — Brinks Gilson & Lione (57) ABSTRACT

Methods and systems to electrically assist an internal combustion engine of an aircraft may be provided. A first bladed rotor may be rotated by a first internal combustion engine. Electricity may be generated from a first motor generator by rotating a first shaft of the first motor generator with the first internal combustion engine. In response to a predetermined event, such as an engine failure, mechanical power may be generated from the first motor generator instead of electricity. The mechanical power may be transferred to the first bladed rotor. The mechanical power may be generated by applying electricity to the first motor generator. The electricity applied is received from a second motor generator, where the electricity received from the second motor generator is generated by rotating a second shaft of the second
(Continued)

motor generator with a second internal combustion engine that powers a second bladed rotor.

20 Claims, 3 Drawing Sheets

(52) U.S. Cl.
CPC ............ *B64D 31/10* (2013.01); *B64D 35/08* (2013.01); *B64D 2027/026* (2013.01); *B64D 2221/00* (2013.01)

(56) References Cited

U.S. PATENT DOCUMENTS

| | | |
|---|---|---|
| 2015/0100181 A1 | 4/2015 | Strauss et al. |
| 2016/0023773 A1* | 1/2016 | Himmelmann ........ B64D 27/10 60/778 |
| 2016/0052626 A1 | 2/2016 | Vander Mey |
| 2016/0176534 A1* | 6/2016 | Himmelmann ....... B60L 3/0092 290/45 |
| 2016/0257416 A1* | 9/2016 | Himmelmann ........ B64D 27/02 |
| 2016/0304214 A1* | 10/2016 | Himmelmann ........ B64D 41/00 |
| 2017/0225794 A1* | 8/2017 | Waltner .................. F01D 15/12 |
| 2017/0327219 A1* | 11/2017 | Alber ..................... B64D 27/24 |
| 2018/0201384 A1* | 7/2018 | Barth ..................... B64D 27/24 |

OTHER PUBLICATIONS

"Electric double-layer capacitor," Mar. 27, 2016, pp. 1-3, Wikipedia, available at en.wikipedia.org.

Extended European Search Report, dated Oct. 16, 2017, pp. 1-6, issued in European Patent Application No. 17 167 512.7, European Patent Office, Munich, Germany.

* cited by examiner

ELECTRICAL ASSIST FOR AIRCRAFT

CROSS-REFERENCE TO RELATED APPLICATIONS

This application claims the benefit of U.S. provisional application 62/337,013, filed May 16, 2016, the entire contents of which are incorporated by reference.

TECHNICAL FIELD

This disclosure relates to aircraft and, in particular, to electrical assist for aircraft.

BACKGROUND

A vertical lift aircraft, such as a helicopter or a tilt-rotor aircraft, may experience one or more engine failures. An engine failure in vertical lift aircraft may result in a crash because the vertical lift aircraft may not be able to establish a sufficiently low rate of descent to the earth's surface. Such a crash may destroy or damage the aircraft, and potentially represent a hazard to people or cargo aboard the aircraft.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a method to electrically assist a first internal combustion engine is provided. In this example, the first internal combustion engine rotates a first bladed rotor, such as a tilt-rotor propeller. A first motor generator generates electricity by rotating a first shaft of the first motor generator with the first internal combustion engine. In the event of a failure of the first internal combustion engine, the first motor generator generates mechanical power that is transferred to the first bladed rotor. The mechanical power generated by the first motor generator results from rotating the first shaft of the first motor generator by applying electricity to the first motor generator that is received from a second motor generator. Specifically, the electricity received from the second motor generator is generated by rotating a second shaft of the second motor generator with a second internal combustion engine that powers a second bladed rotor.

One technical advantage of the systems and methods described herein may be that the first bladed rotor continues to be electrically powered, or at least electrically assisted, after the internal combustion engine(s) that power the first bladed rotor fail. Another technical advantage of the systems and methods described below, at least in some examples, is that electrical assist may be provided if cross-shafting fails. Cross-shafting is mechanical coupling through which either one of two internal combustion engines may mechanically power both of the first bladed rotor 106 and the second bladed rotor. One or more of the advantages may be particularly apparent if the aircraft is in combat and the cross-shafting and/or the internal combustion engines associated with the first motor generator are destroyed and/or damaged.

Figure 1:
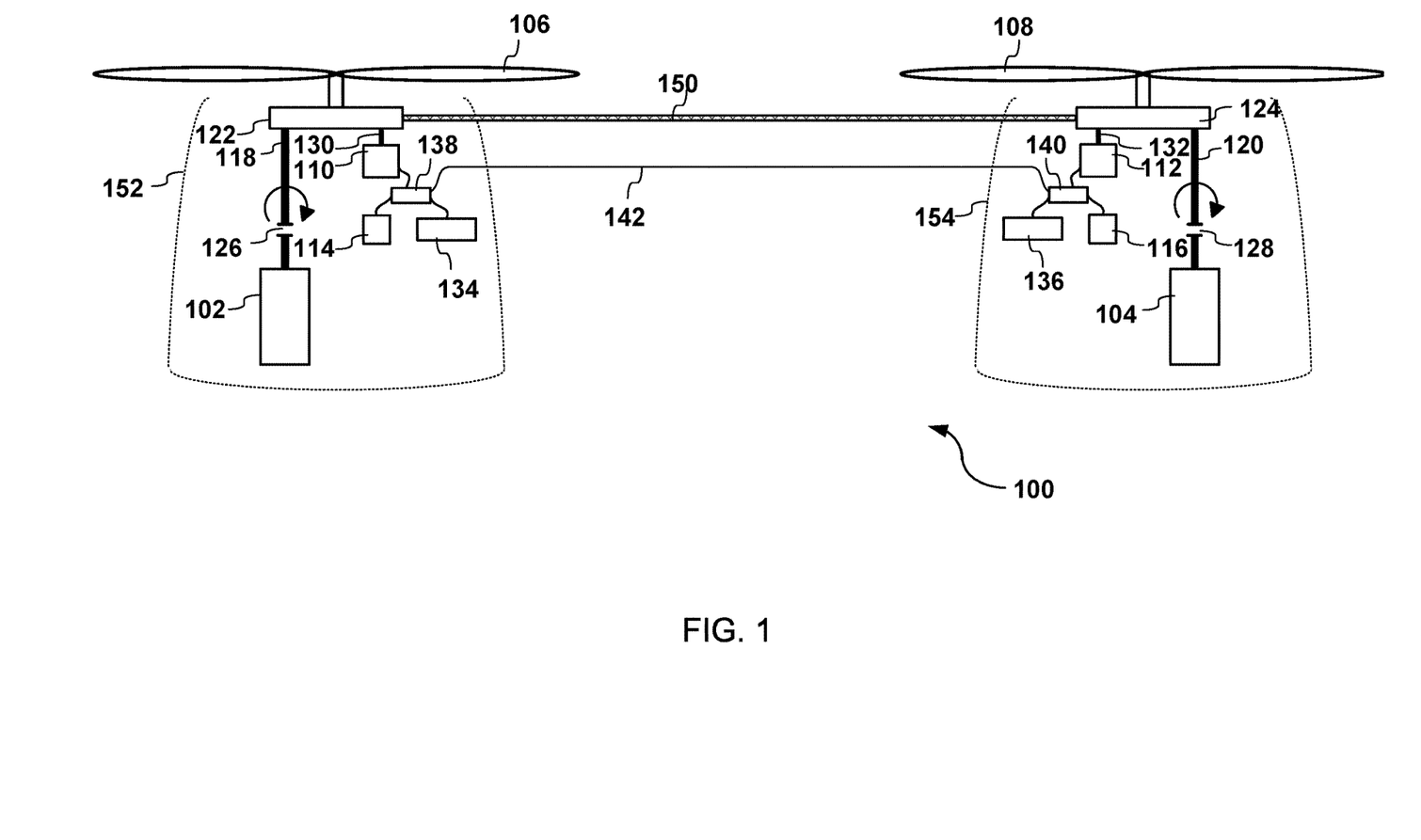
FIG. 1 illustrates an example of an aircraft engine system that provides electrical assist for an aircraft.

FIG. 1 illustrates an example of an aircraft engine system 100 that provides electrical assist for an aircraft. The aircraft engine system 100 or aircraft propulsion system may include a first internal combustion engine 102, a second internal combustion engine 104, a first bladed rotor 106, a second bladed rotor 108, a first motor generator 110, a second motor generator 112, a first control unit 114, and a second control unit 116.

Each of the internal combustion engines 102 and 104 may be any type of engine in which combustion of a fuel occurs with an oxidizer (such as air) in a combustion chamber that is an integral part of a working fluid flow circuit of the engine. Examples of the internal combustion engines 102 and 104 may include a gas turbine engine, a jet engine, a turbine fan engine, a two-stroke piston engine, a four-stroke piston engine, a pistonless rotary engine, or any other type of internal combustion engine.

Each of the bladed rotors 106 and 108 may be any type of aircraft rotor that has blades. Alternatively or in addition, each of the bladed rotors 106 and 108 may be any device that rotates about an axis and has blades extending perpendicularly to the axis, which cause air to move in a direction substantially in parallel to the axis when the blades rotate about the axis. Examples of the bladed rotors 106 and 106 may include a propeller, an aircraft propeller, a helicopter propeller, a tiltrotor propeller, a propeller external to an engine nacelle, or any other type of aircraft rotor having blades.

Each of the motor generators 110 and 112 may be any device that is operable as both an electric motor and an electric generator. Alternatively or in addition, each of the motor generators 110 and 112 may be any device that converts electrical power to mechanical power, namely, rotational power, and that converts rotational power to electrical power. The first motor generator 110 may include a first shaft 130, and the second motor generator 112 may include a second shaft 132. An example of each of the motor generators 110 and 112 may include a single unit dynamotor having a motor coil to drive the motor and a generator coil to generate electricity, where both of the coils are wound around a single rotor, such as the shaft 130 or 132, and both of the coils share common outer field coil(s) and/or magnet(s). Alternatively or in addition, an example of each of the motor generators 110 and 112 may include a single unit having one or more coils wound around a single rotor, such as the shaft 130 or 132, that may be used to generate electricity when the shaft 130 or 132 is rotated and mechanical energy when electricity is applied to the one or more coils, where the one or more coils share common outer field coil(s) and/or magnet(s). Alternatively or in addition, an example of each of the motor generators 110 and 112 may include distinct motor and generator machines coupled together.

In FIG. 1, the first internal combustion engine 102 is coupled to the first bladed rotor 106. For example, the first internal combustion engine 102 may be coupled to the first bladed rotor 106 by a first drive shaft 118 that feeds into a first gearbox 122. The first gearbox 122 turns the first bladed rotor 106 in response to rotation of the first drive shaft 118. A first clutch 126 may be positioned between the first internal combustion engine 102 and the drive shaft 118 such that the first internal combustion engine 102 rotates the first drive shaft 118 if the first clutch 126 is engaged, but not if the first clutch 126 is not engaged.

Similarly, in FIG. 1, the second internal combustion engine 104 is coupled to the second bladed rotor 108. For example, the second internal combustion engine 104 may be coupled to the second bladed rotor 108 by a second drive shaft 120 that feeds into a second gearbox 124. The second gearbox 124 turns the second bladed rotor 108 in response to rotation of the second drive shaft 120. A second clutch 128 may be positioned between the second internal combustion engine 104 and the second drive shaft 120 such that the second internal combustion engine 104 rotates the second drive shaft 120 if the second clutch 128 is engaged, but not if the second clutch 128 is not engaged.

The first shaft 130 of the first motor generator 110 may be configured to receive mechanical energy from the first internal combustion engine 102. For example, the first internal combustion engine 102 may be configured to rotate the first shaft 130 of first motor generator 110. In FIG. 1, the first internal combustion engine 102 may rotate the drive shaft 118 leading to the first gearbox 122 if the first clutch 126 is engaged; and the first gearbox 122 may be geared to rotate the shaft 130 of the first motor generator 110 in response to rotation of the drive shaft 118 by the first internal combustion engine 102.

Similarly, the second shaft 132 of the second motor generator 112 may be configured to receive mechanical energy from the second internal combustion engine 104. For example, the second internal combustion engine 104 may be configured to rotate the second shaft 132 of second motor generator 112. In FIG. 1, the second internal combustion engine 104 may rotate the drive shaft 120 leading to the second gearbox 124 if the second clutch 128 is engaged; and the second gearbox 124 may be geared to rotate the shaft 132 of the second motor generator 112 in response to rotation of the drive shaft 120 by the second internal combustion engine 104.

The first control unit 114 may be any device configured to control whether the first motor generator 110 operates as a generator or as a motor. Similarly, the second control unit 116 may be any device configured to control whether the second motor generator 112 operates as a generator or as a motor.

The aircraft engine system 100 may include an electrical link 142, such as a power cable, a wire, and/or a combination of wires. The electrical link 142 may electrically couple the first motor generator 110 to the second motor generator 112. The electrical link 142 may electrically couple the first motor generator 110 to the second motor generator 112 via one or more electrical components, such as, for example, a first switch 138 and a second switch 140 as illustrated in FIG. 1.

The first switch 138 may be controlled by the first control unit 114. The first switch 138 may, selectively, electrically couple an input and/or an output of the first motor generator 110 to the electrical link 142. Alternatively or in addition, the first switch 138 may, selectively, electrically couple an input and/or an output of the first motor generator 110 to one or more other devices, such as a first battery 134.

Similarly, the second switch 140 may be controlled by the second control unit 116. The second switch 140 may, selectively, electrically couple an input and/or an output of the second motor generator 112 to the electrical link 142. Alternatively or in addition, the second switch 140 may, selectively, electrically couple an input and/or an output of the second motor generator 112 to one or more other devices, such as a second battery 136.

During operation of the aircraft engine system 100, the first control unit 114 may direct the first motor generator 110 to operate as a generator. The first control unit 114 may provide electricity generated by the first motor generator 110 to, for example, a first battery 134, the first switch 138, and/or any other device. The electricity generated by the first motor generator 114 is due to a rotation of the first shaft 130 of the first motor generator 110 caused by the first internal combustion engine 102.

Similarly, the second control unit 116 may direct the second motor generator 112 to operate as a generator. The second control unit 116 may provide electricity generated by the second motor generator 112 to, for example, a second battery 136, the second switch 140, and/or any other device. The electricity generated by the second motor generator 116 is due to a rotation of the second shaft 132 of the second motor generator 112 caused by the second internal combustion engine 104.

A first voltage sensor (not shown) may detect a voltage on the electrical link 142 on behalf of the first control unit 114. If no voltage is detected, then the first control unit 114 may direct the first switch 138 to provide the electricity generated by the first motor generator 110 to the electrical link 142. Alternatively or in addition, a second voltage sensor (not shown) may detect a voltage on the electrical link 142 on behalf of the second control unit 116. If no voltage is detected, then the second control unit 116 may direct the second switch 140 to provide the electricity generated by the second motor generator 112 to the electrical link 142.

If either the first internal combustion engine 102 or the second internal combustion engine 104 fails, then the motor generator 110 or 112 that is powered by the combustion engine 102 or 104 that has not failed, may provide electric power via the electrical link 142 to the other motor generator 110 or 112. For example, if the first internal combustion engine 102 fails, then the second motor generator 112 may provide electric power over the electrical link 142 to the first motor generator 110. The first motor generator 110 may then operate as a motor to power or partially power the first bladed rotor 106.

For example, the first control unit 114 may cause the first motor generator 110 to generate mechanical power that is transferred to the first bladed rotor 106, where the mechanical power generated by the first motor generator 110 is due to a rotation of the first shaft 130 caused by an application of electricity to the first motor generator 110. To cause the first motor generator 110 to generate mechanical power, the first control unit 114 may, for example, direct the first switch 138 to connect an input of the first motor generator 110 with the electrical link 142. The mechanical power from the first motor generator 110 may be transferred to the first bladed rotor 106 via, for example, the first shaft 130 and the first gearbox 122. The electricity applied to the first motor generator 110 may be generated by the second motor generator 112 and transferred via the electrical link 142. The electricity generated by the second motor generator 112 is due to a rotation of the second shaft 132 of the second motor generator 112 by the second internal combustion engine 104.

In some examples, the first control unit 114 may disengage the first clutch 126 when the first control unit 114 causes the first motor generator 110 to generate mechanical power. If the first internal combustion engine 102 fails completely, then disengaging the first clutch 126 may have the advantage that the first motor generator 110 rotates the first bladed rotor 106 without incurring a mechanical load from the first internal combustion engine 102.

The mechanical power generated by the first motor generator 110 may not be enough to fly an aircraft. However, in such instances, the generated power may be sufficient to cause the first bladed rotor 106 to generate enough thrust to slow the descent of an aircraft. Alternatively or in addition, the generated power may be sufficient to aid in controlling the aircraft during descent. Accordingly, the aircraft engine system 100 may prevent a crash and/or limit the damage caused by a crash in the event of an engine failure.

As described above, the first control unit 114 may cause the first motor generator 110 to generate the mechanical power in response to a failure of the first internal combustion engine 102. More generally, the first control unit 114 may cause the first motor generator 110 to generate the mechanical power in response to a predetermined event. The predetermined event may be a failure of the first internal combustion engine 102 as described above.

Alternatively, the predetermined event may be a combined failure of the first internal combustion engine and a cross-shafting 150. The cross-shafting 150 may be a mechanical coupling that provides a capability for either one of the internal combustion engines 102 and 104 to mechanically power both of the first bladed rotor 106 and the second bladed rotor 108.

In another example, the predetermined event may be a loss of power in the first internal combustion engine 102 but not a complete failure of the first internal combustion engine 102. Alternatively or in addition, the predetermined event may be a manual request. For example, the manual request may be a request made by a pilot or crew member via a control panel, a button, or any other user interface device.

In some examples, the predetermined event may be detected by one or more sensors in communication with the first control unit 114. For example, an engine sensor may detect whether the first internal combustion engine 102 has failed and/or lost power. Alternatively or in addition, a sensor or a combination of sensors may determine whether the cross-shafting 150 fails.

As described above, the electrical link 142 may be configured to transfer the electricity that is applied to the first motor generator 110 and generated by the second motor generator 112. In some examples, the electrical link 150 extends from a first wing of an aircraft to a second wing of the aircraft. Alternatively or in addition, the electrical link 142 may extend between opposite sides of an aircraft.

In some examples, the first internal combustion engine 102 and the first motor generator 110 are in a first nacelle 152, and the second internal combustion engine 104 and the second motor generator 112 are in a second nacelle 154. Each of the first nacelle 152 and the second nacelle 154 may be a housing on the outside of an aircraft. Alternatively or in addition, each of the nacelles 152 and 154 may be an outer casing of an aircraft engine.

The electrical link 142 may extend from a first wing of an aircraft to a second wing of the aircraft. Alternatively, the electrical link 142 may extend between opposite sides of an aircraft. The electrical link 142 may extend along a single wing from one side of the aircraft to another. Alternatively, the electrical link 142 may extend along a wing on one side of an aircraft, where the nacelles 152 and 154 are positioned on the wing.

The aircraft engine system 100 may include more, fewer, or different elements than illustrated in FIG. 1. For example, the system 100 may additionally include the first switch 138, the first battery 134, the second switch 140, and the second battery 136. Alternatively, the system 100 may only include one or more components in the first nacelle 152, such as the first internal combustion engine 102, the first clutch 126, the first shaft 118, the first motor generator 110, the first switch 138, the first control unit 114, and/or the first battery 134.

The aircraft engine system 100 illustrated in FIG. 1 is symmetrical so that either one of the internal combustion engines 102 and 104 may fail and the non-failing internal combustion engine 102 or 104 may provide electrical power to the motor generator 110 or 112 on the failing side. However, in some examples, the system 100 may not be symmetrical. For example, one side may not include a control unit and include a generator instead of a motor generator.

In some examples, the system 100 may not include the first and second gearboxes 122 and 124. For example, the first drive shaft 118 may couple directly to first bladed rotor 106; and the first drive shaft 118 may act as the first shaft 130 of the first motor generator 110.

In some examples, the first internal combustion engine 102 is a gas turbine engine and the first bladed rotor 106 is a fan rotor or a low-pressure turbine rotor of the gas turbine engine. In addition, the first internal combustion engine 102 may be a turbofan and the first bladed rotor 106 may be a fan rotor or a low-pressure turbine bladed rotor of the turbofan.

Figure 2:
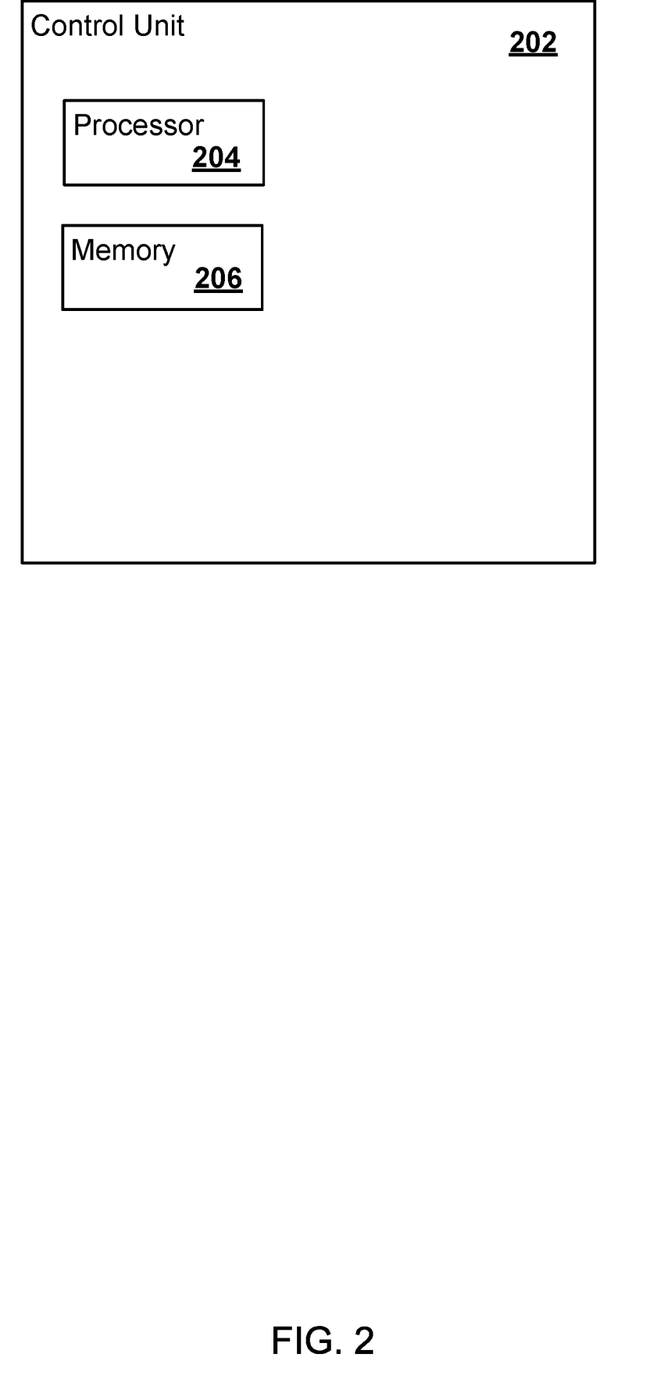
FIG. 2 illustrates a block diagram of an example of a control unit.

FIG. 2 illustrates a block diagram of an example of a control unit 202, such as the first control unit 114 and/or the second control unit 116. The control unit 202 may include a memory 206 and a processor 204.

The processor 204 may be in communication with the memory 206. The processor 204 may also be in communication with additional elements, such as the first switch 138, the first motor generator 110, and/or the first clutch 126. Examples of the processor 204 may include a general processor, a central processing unit, a microcontroller, a server, an application specific integrated circuit (ASIC), a digital signal processor, a field programmable gate array (FPGA), and/or a digital circuit, analog circuit.

The processor 204 may be one or more devices operable to execute logic. The logic may include computer executable instructions or computer code embodied in the memory 206 or in other memory that, when executed by the processor 204, cause the processor to perform the features implemented by the logic. The computer code may include instructions executable with the processor 204.

The memory 206 may be any device for storing and retrieving data or any combination thereof. The memory 206 may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device.

The system 100 may be implemented in many different ways. The control unit 202 may be hardware or a combination of hardware and software. For example, the control unit 202 (the first control unit 114 or the second control unit 116) may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the control unit 202 may include memory hardware, such as a portion of the memory 206, for example, that comprises instructions executable with the processor 204 or other processor to implement one or more of the features of the control unit 202. When the control unit 202 includes the portion of the memory that comprises instructions executable with the processor, the control unit 202 may or may not include the processor. In some examples, the control unit 202 may just be the portion of the memory 206 or other physical memory that comprises instructions executable with the processor 204 or other processor to implement the features of the control unit 202 without the control unit including any other hardware. Because the control unit 202 includes at least some hardware even when the included hardware comprises software, the control unit 202 may be interchangeably referred to as the control unit hardware.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

Figure 3:
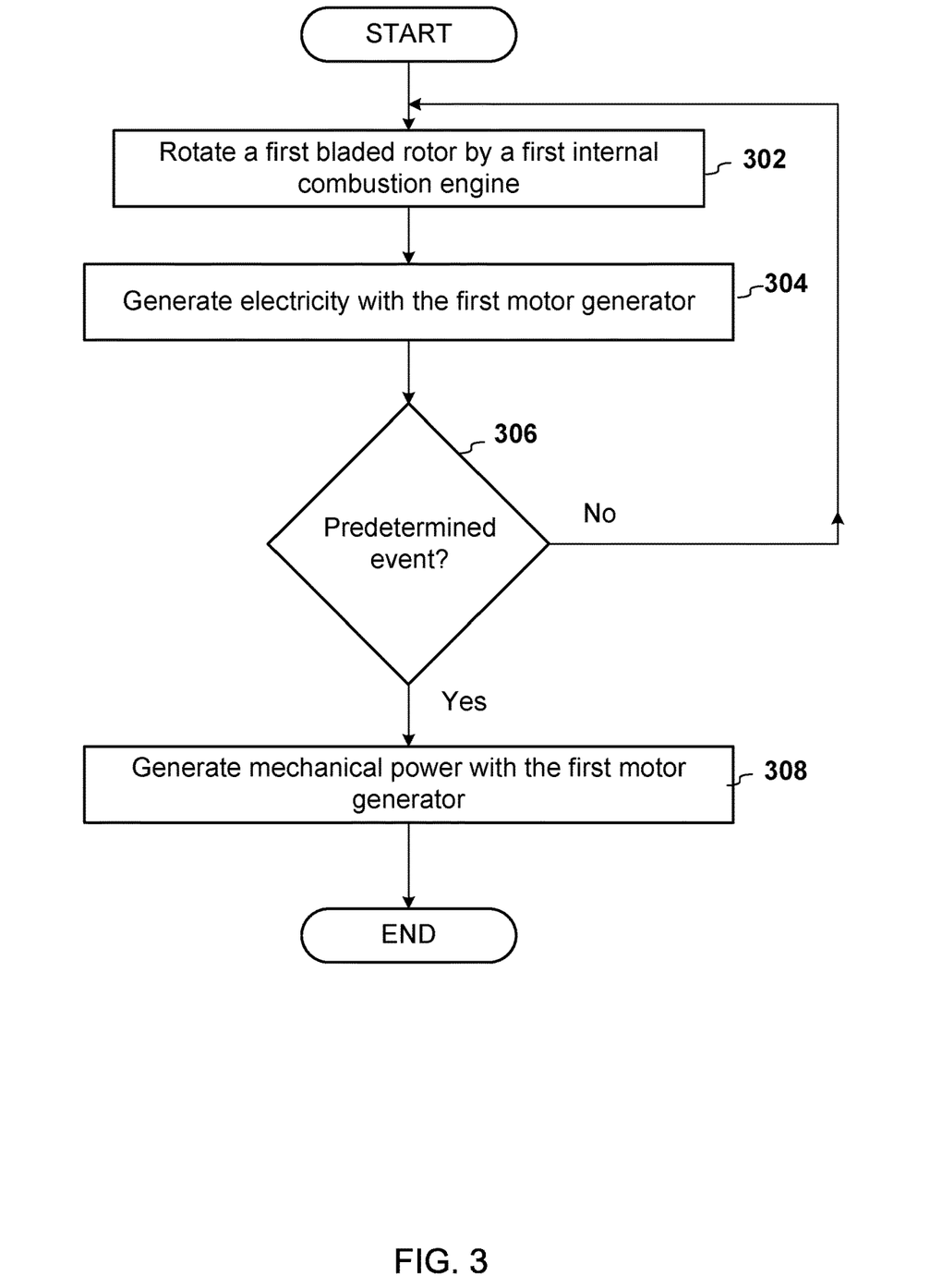
FIG. 3 illustrates a flow diagram of an example of the logic of a control unit.

FIG. 3 illustrates a flow diagram of an example of the logic of the first control unit 114. The logic may include additional, different, or fewer operations than illustrated in FIG. 3. The operations may be executed in a different order than illustrated in FIG. 3.

Operations may begin by causing the first bladed rotor 106 to be rotated (302) by the first internal combustion engine 102. For example, causing the first bladed rotor 106 to be rotated may include engaging the first clutch 126.

The first motor generator 110 may be directed to generate (304) electricity by rotating the first shaft 130 of the first motor generator 110 with the first internal combustion engine 102. For example, the first motor generator 110 may be directed to operate as a generator and/or the first switch 138 may be directed to disconnect the first motor generator 110 from the electrical link 142.

A predetermined event may be detected (306). For example, a failure of the first internal combustion engine 102 may be detected.

In response to detection of the predetermined event, the first motor generator 110 may be directed to generate (308) mechanical power, which is transferred to the first bladed rotor 106. For example, the mechanical power may be generated by rotating the first shaft 130 of the first motor generator 110 by applying electricity to the first motor generator 110 received from the second motor generator 112. The electricity received from the second motor generator 112 may be generated by rotating the second shaft 132 of the second motor generator 112 with the second internal combustion engine 104 that powers the second bladed rotor 108.

Operations may end by, for example, turning off the first and the second internal combustion engines 102 and 104. In a different example, operations may end by causing the first bladed rotor 106 to be rotated by the first internal combustion engine 102 if the first internal combustion engine 102 recovers from a failure.

As described above, FIG. 3 illustrates a flow diagram of an example of the logic of the first control unit 114. The logic of the second control unit 116 may be identical to the logic of the first control unit 114 except that in the description of the logic, the word "first" is replaced by the word "second". For example, where the first control unit 114 may cause the "first" bladed rotor 106 to be rotated by the "first" internal combustion engine 102, the second control unit 116 may cause the "second" bladed rotor 108 to be rotated by the "second" internal combustion engine 104, and so on. Alternatively, the logic of the second control unit 116 may be different that the logic of the first control unit 114.

All of the discussion, regardless of the particular implementation described, is exemplary in nature, rather than limiting. For example, although selected aspects, features, or components of the implementations are depicted as being stored in memories, all or part of the control unit 202 may be stored on, distributed across, or read from other computer readable storage media, for example, secondary storage devices such as hard disks, flash memory drives, floppy disks, and CD-ROMs.

The respective logic, software or instructions for implementing the processes, methods and/or techniques discussed above regarding the control unit 202 may be provided on computer readable storage media. The functions, acts or tasks illustrated in FIG. 3 or described herein regarding the control unit 202 (the first control unit 114 or the second control unit 116) may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure relates, among others, to the following aspects:

1. An aircraft engine system comprising:
    a first internal combustion engine coupled to a first bladed rotor;
    a second internal combustion engine coupled to a second bladed rotor;
    a first motor generator having a first shaft, the first shaft configured to receive mechanical energy from the first internal combustion engine;
    a second motor generator having a second shaft, the second shaft configured to receive mechanical energy from the second internal combustion engine; and
    a control unit configured to cause the first motor generator to generate electricity, the electricity generated by the first motor generator by a rotation of the first shaft caused by the first internal combustion engine, wherein the control unit is further configured to alternatively cause the first motor generator to generate mechanical power that is transferred to the first bladed rotor, the mechanical power generated by the first motor generator is due to a rotation of the first shaft caused by an application of electricity to the first motor generator, wherein the electricity applied to the first motor generator is generated by the second motor generator, the electricity generated by the second motor generator is due to a rotation of the second shaft by the second internal combustion engine coupled to the second bladed rotor.

2. The system of aspect 1, wherein the first internal combustion engine and the first motor generator are in a first nacelle, and the second internal combustion engine and the second motor generator are in a second nacelle.

3. The system of any of aspects 1 to 2 further comprising an electrical link configured to transfer the electricity that is applied to the first motor generator and generated by the second motor generator, wherein the electrical link extends from a first wing of an aircraft to a second wing of the aircraft.

4 The system of any of aspects 1 to 3 further comprising an electrical link configured to transfer the electricity that is applied to the first motor generator and generated by the second motor generator, wherein the electrical link extends between opposite sides of an aircraft.

5 The system of any of aspects 1 to 4, wherein the control unit is further configured to cause the first motor generator to generate the mechanical power in response to a predetermined event.

6. An aircraft propulsion system comprising:
    a first internal combustion engine coupled to a first bladed rotor;
    a first motor generator having a first shaft, the first shaft configured to receive mechanical energy from the first internal combustion engine; and
    a control unit configured to direct the first motor generator to generate electricity, the electricity generated by the first motor generator due to a rotation of the first shaft caused by the first internal combustion engine, wherein the control unit is further configured to alternatively cause the first motor generator, in response to a predetermined event, to generate mechanical power that is transferred to the first bladed rotor, the mechanical power generated by the first motor generator is due to a rotation of the first shaft caused by an application of electricity to the first motor generator, wherein the electricity applied to the first motor generator is received from a second motor generator that is generated by a rotation of a second shaft of the second motor generator, the rotation of the second shaft of the second motor generator caused by a second internal combustion engine configured to power a second bladed rotor.

7. The aircraft propulsion system of aspect 6, wherein the predetermined event is detected.

8. The aircraft propulsion system of any of aspects 6 to 7, wherein the predetermined event is a failure of the first internal combustion engine.

9. The aircraft engine of any of aspects 6 to 8, wherein the predetermined event is a failure of the first internal combustion engine and a failure of a cross-shafting.

10. The aircraft propulsion system of any of aspects 6 to 7, wherein predetermined event is a failure of a cross-shafting.

11. The aircraft propulsion system of any of aspects 6 to 7, wherein predetermined event is a manual request.

12. The aircraft propulsion system of any of aspects 6 to 11, wherein the first internal combustion engine and the second internal combustion engine are gas turbine engines.

13. The aircraft propulsion system of any of aspects 6 to 12, wherein the first bladed rotor and the second bladed rotor are aircraft propellers.

14. The aircraft propulsion system of any of aspects 6 to 12, wherein the first bladed rotor and the second bladed rotor are tiltrotor propellers and/or helicopter propellers.

15. The aircraft propulsion system of any of aspects 6 to 14, wherein the control unit is configured to direct a clutch to disengage if the first motor generator is directed to generated the mechanical power, wherein disengagement of the clutch enables the first bladed rotor to rotate freely of the first internal combustion engine.

16. A method to electrically assist an internal combustion engine, the method comprising:
   rotating a first bladed rotor by a first internal combustion engine;
   generating electricity from a first motor generator by rotating a first shaft of the first motor generator with the first internal combustion engine; and
   generating, in response to a predetermined event, mechanical power from the first motor generator instead of electricity, wherein the mechanical power is transferred to the first bladed rotor, wherein generating the mechanical power comprises rotating the first shaft of the first motor generator by applying electricity to the first motor generator received from a second motor generator, and wherein the electricity received from the second motor generator is generated by rotating a second shaft of the second motor generator with a second internal combustion engine that powers a second bladed rotor.

17. The method of aspect 16, wherein the first bladed rotor and the second bladed rotor are aircraft propellers.

18. The method of aspect 16, wherein the first bladed rotor and the second bladed rotor are tiltrotor propellers and/or helicopter propellers.

19. The method of any of aspects 16 to 18 further comprising disengaging a clutch when generating the mechanical power, wherein disengaging the clutch enables the first bladed rotor to rotate freely of the first internal combustion engine.

20. The method of any of aspects 16 to 19 further comprising applying additional electricity to the first motor generator from a battery when applying electricity to the first motor generator received from a second motor generator.

What is claimed is:

1. An aircraft engine system comprising:
   a first internal combustion engine mechanically coupled to a first bladed rotor for rotation of the first bladed rotor;
   a second internal combustion engine mechanically coupled to a second bladed rotor for rotation of the second bladed rotor;
   a first motor generator having a first shaft, the first shaft configured to receive mechanical energy from the first internal combustion engine;
   a second motor generator having a second shaft, the second shaft configured to receive mechanical energy from the second internal combustion engine; and
   a control unit configured to cause the first motor generator to generate electricity, the electricity generated by the first motor generator by a rotation of the first shaft caused by the first internal combustion engine, wherein the control unit is further configured to alternatively cause the first motor generator to generate mechanical power that is transferred to the first bladed rotor, the mechanical power generated by the first motor generator is due to a rotation of the first shaft caused by an application of electricity to the first motor generator, wherein the electricity applied to the first motor generator is generated by the second motor generator, the electricity generated by the second motor generator is due to a rotation of the second shaft by the second internal combustion engine mechanically coupled to the second bladed rotor.

2. The system of claim 1, wherein the first internal combustion engine and the first motor generator are in a first nacelle, and the second internal combustion engine and the second motor generator are in a second nacelle.

3. The system of claim 1 further comprising an electrical link configured to transfer the electricity that is applied to the first motor generator and generated by the second motor generator, wherein the electrical link extends from a first wing of an aircraft to a second wing of the aircraft.

4. The system of claim 1 further comprising an electrical link configured to transfer the electricity that is applied to the first motor generator and generated by the second motor generator, wherein the electrical link extends between opposite sides of an aircraft.

5. The system of claim 1, wherein the control unit is further configured to cause the first motor generator to generate the mechanical power in response to a predetermined event.

6. An aircraft propulsion system comprising:
   a first internal combustion engine mechanically coupled to a first bladed rotor for rotation of the first bladed rotor;
   a first motor generator having a first shaft, the first shaft configured to receive mechanical energy from the first internal combustion engine; and
   a control unit configured to direct the first motor generator to generate electricity, the electricity generated by the first motor generator due to a rotation of the first shaft caused by the first internal combustion engine, wherein the control unit is further configured to alternatively cause the first motor generator, in response to a predetermined event, to generate mechanical power that is transferred to the first bladed rotor, the mechanical power generated by the first motor generator is due to a rotation of the first shaft caused by an application of electricity to the first motor generator, wherein the electricity applied to the first motor generator is received from a second motor generator that is generated by a rotation of a second shaft of the second motor generator, the rotation of the second shaft of the second motor generator caused by a second internal combustion engine configured to mechanically power a second bladed rotor.

7. The aircraft propulsion system of claim 6, wherein the predetermined event is detected.

8. The aircraft propulsion system of claim 6, wherein the predetermined event is a failure of the first internal combustion engine.

9. The aircraft engine of claim 6, wherein the predetermined event is a failure of the first internal combustion engine and a failure of a cross-shafting.

10. The aircraft propulsion system of claim 6, wherein predetermined event is a failure of a cross-shafting.

11. The aircraft propulsion system of claim 6, wherein predetermined event is a manual request.

12. The aircraft propulsion system of claim 6, wherein the first internal combustion engine and the second internal combustion engine are gas turbine engines.

13. The aircraft propulsion system of claim 6, wherein the first bladed rotor and the second bladed rotor are aircraft propellers.

14. The aircraft propulsion system of claim 6, wherein the first bladed rotor and the second bladed rotor are tiltrotor propellers and/or helicopter propellers.

15. The aircraft propulsion system of claim 6, wherein the control unit is configured to direct a clutch to disengage if the first motor generator is directed to generate the mechanical power, wherein disengagement of the clutch enables the first bladed rotor to rotate freely of the first internal combustion engine.

16. A method to electrically assist an internal combustion engine, the method comprising:

rotating a first bladed rotor by a first internal combustion engine of an aircraft via a mechanical coupling between the first internal combustion engine and the first bladed rotor;

generating electricity from a first motor generator by rotating a first shaft of the first motor generator with the first internal combustion engine; and generating, in response to a predetermined event, mechanical power from the first motor generator instead of electricity, wherein the mechanical power is transferred to the first bladed rotor, wherein generating the mechanical power comprises rotating the first shaft of the first motor generator by applying electricity to the first motor generator received from a second motor generator, and wherein the electricity received from the second motor generator is generated by rotating a second shaft of the second motor generator with a second internal combustion engine of the aircraft that mechanically powers a second bladed rotor.

17. The method of claim 16, wherein the first bladed rotor and the second bladed rotor are aircraft propellers.

18. The method of claim 16, wherein the first bladed rotor and the second bladed rotor are tiltrotor propellers and/or helicopter propellers.

19. The method of claim 16 further comprising disengaging a clutch when generating the mechanical power, wherein disengaging the clutch enables the first bladed rotor to rotate freely of the first internal combustion engine.

20. The method of claim 16 further comprising applying additional electricity to the first motor generator from a battery when applying electricity to the first motor generator received from a second motor generator.

* * * * *